US012717788B2

(12) United States Patent
Yakovenko

(10) Patent No.: US 12,717,788 B2
(45) Date of Patent: Aug. 25, 2026

(54) DATABASE ENTITY, ORIGINATING DATABASE ENTITY, AND METHODS FOR USE IN THE SAME

(71) Applicant: HUAWEI TECHNOLOGIES CO., LTD., Shenzhen (CN)

(72) Inventor: Roman Yakovenko, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/821,850

(22) Filed: Aug. 30, 2024

(65) Prior Publication Data

US 2025/0061114 A1 Feb. 20, 2025

Related U.S. Application Data

(63) Continuation of application No. PCT/EP2022/055278, filed on Mar. 2, 2022.

(51) Int. Cl.
*G06F 16/2455* (2019.01)

(52) U.S. Cl.
CPC ................................ *G06F 16/2455* (2019.01)

(58) Field of Classification Search
None
See application file for complete search history.

(56) References Cited

U.S. PATENT DOCUMENTS 9,069,853 B2 * 6/2015 Stading ................... G06F 16/93
12,204,474 B2 * 1/2025 Hillel .................. G06F 13/1694
12,235,853 B1 * 2/2025 Tan ................... G06F 16/24578
12,277,076 B2 * 4/2025 Hillel .................. G06F 11/1044
12,436,904 B2 * 10/2025 Hillel .................... G06F 9/5016
12,501,253 B2 * 12/2025 Colom Ikuno ......... H04W 8/12
12,566,768 B1 * 3/2026 Oncevay ........... G06F 16/24578
2008/0243787 A1 * 10/2008 Stading ................. G06F 16/951
2011/0098917 A1 * 4/2011 LeBeau ................. G06F 3/0482
707/706
2019/0163823 A1 5/2019 Bhattacharjee et al.
2023/0292100 A1 * 9/2023 Colom Ikuno ......... H04W 8/12
2025/0061114 A1 * 2/2025 Yakovenko ....... G06F 16/24534
2025/0209050 A1 * 6/2025 Su ....................... G06F 16/2219
(Continued)

OTHER PUBLICATIONS

Toward a Progress Indicator for Database Queries (Year: 2004).*
(Continued)

*Primary Examiner* — Kim T Nguyen
(74) *Attorney, Agent, or Firm* — Leydig, Voit & Mayer, Ltd.

(57) ABSTRACT

A database entity includes a controller and a memory is provided. The controller is configured to receive a request based on a query received by a client node through an originating database entity. The request includes an indicator of a function to generate a result, an indicator of data on which the function is to be performed, and an indicator of a destination. The controller is further configured to retrieve data according to the indicator of data and execute the indicated function on the retrieved data. Further, the controller transmits the request to the indicated destination. The transmission of the relevant data directly to the indicated destination reduces the query processing latency which further reduces the memory usage.

20 Claims, 3 Drawing Sheets

(56) References Cited

U.S. PATENT DOCUMENTS

2025/0355873 A1* 11/2025 Reviv ............... G06F 16/24556
2026/0057296 A1* 2/2026 Sankaranarayanan ....................... G06F 16/2455

OTHER PUBLICATIONS

Incorporating Query Expansion and Quality Indicators in Searching Microblog Posts (Year: 2011).*
"SQL Select Into Statement," W3 Schools, XP055886878, Total 6 pages (Jan. 2014).
"SQL Count( ), Avg( ) and SUM( ) Functions," W3 Schools, XP055965476, Total 8 pages (Dec. 2019).

* cited by examiner

DATABASE ENTITY, ORIGINATING DATABASE ENTITY, AND METHODS FOR USE IN THE SAME

CROSS-REFERENCE TO RELATED APPLICATIONS

This application is a continuation of International Application No. PCT/EP2022/055278, filed on Mar. 2, 2022, the disclosure of which is hereby incorporated by reference in its entirety.

TECHNICAL FIELD

Embodiments of the present disclosure relate generally to the field of database management and, more specifically, to a database entity, an originating database entity, and methods for use in the database entity and the originating database entity.

BACKGROUND

Generally, a clustered database corresponds to a collection of database nodes that are used to store and process a plurality of data. Conventionally, a client node sends a query to the clustered database, such as to a database node to retrieve the required data from the clustered database. Moreover, a conventional storage system is used to help the database node, such as the database node requests the storage system to retrieve the data, and then transmit the data to back the client node through the same path. As a result, the data flows firstly from the client node to the database node, and then to the storage system, and vice versa, which is not desirable because it requires a long query processing latency and time. Therefore, there exists a technical problem of how to reduce the query processing latency to retrieve the data from the database node to the client node.

Therefore, in light of the foregoing discussion, there exists a need to overcome the aforementioned drawbacks associated with conventional storage systems.

SUMMARY

The present disclosure provides a database entity and a method for use in the database entity. The present disclosure further provides an originating database entity and a method for use in the originating database entity. The present disclosure provides a solution to the existing problem of how to reduce the query processing latency to retrieve the data from the database node to the client node. An objective of the present disclosure is to provide a solution that overcomes at least partially the problems encountered in the prior art and provides an improved database entity, an improved originating database entity, and improved methods for use in the database entity and also in the originating database entity. For example, for use in a clustered database near data processing (NDP) double predicate usage.

One or more objectives of the present disclosure are achieved by the solutions provided in the enclosed independent claims. Advantageous implementations of the present disclosure are further defined in the dependent claims.

In one aspect, the present disclosure provides a database entity comprising a controller and a memory. The controller is configured to receive a request based on a query received by an originating database entity from a client node. The request comprises an indicator of a function to generate a result, an indicator of data on which the function is to be performed, and an indicator of a destination for the result to be transmitted. The controller is further configured to retrieve data according to the indicator of data and execute the indicated function on the retrieved data.

The database entity includes the controller for receiving the request that enables the database entity to retrieve the data and transmit the data directly to the client node. The transmission of the relevant data directly to the client node reduces the query processing latency which further reduces memory usage and bandwidth usage. Further, the controller reduces the memory copies, and the context switches between a user and a kernel.

In an implementation form, the controller is configured to receive the request from the originating database entity.

In this implementation, the controller is configured to receive the request from the originating database entity, which enables the controller to receive the request for further generation of the results.

In a further implementation form, the controller is configured to transmit the partial result by generating a further request comprising the partial result, the indicator of function, and a further indicator of destination, and to transmit the further request to another database entity.

By virtue of generating the partial result and transmitting the partial result to another database entity along with the indicator function enables the database entity to generate the relevant data and further transmits the relevant data to the client node.

In a further implementation form, the controller is configured to generate a final result and the destination is the client node.

By virtue of generating the final result and transmitting the final result to the client node, the client node gets the relevant data directly from the database entity.

In a further implementation form, the controller is configured to receive the request from another database entity and the data indicator includes a partial result to be further processed by the indicated function.

In this implementation, the request including partial result received by the controller enables the controller to search for the data in the database entity and further process the partial result to get the final result.

In a further implementation form, the controller is configured to retrieve the data according to the indicator of data from the memory.

By virtue of retrieving the data according to the indicator of data from the memory, the controller is able to traverse through the database entity and retrieve the relevant data.

In a further implementation form, the controller is configured to retrieve the data from another database entity as indicated by the indicator of data.

In this implementation, the controller generates the relevant results to transmit the relevant results to the client node.

In a further implementation form, the controller is configured to retrieve the data by receiving the data.

By virtue of retrieving the data by receiving the data, the controller to able to generate the relevant results for the client node.

In a further implementation form, the database entity is a database node, and the memory is a local memory.

As the database entity is a database node and the memory is the local memory, thus the database entity can interact with other database nodes to transfer the request to the database node to retrieve and transmit the relevant data to the user.

In a further implementation form, the database entity is a database storage node, and the memory is a disc storage memory.

As the database entity is a database storage node and the memory is the disc storage memory, thus the database entity can interact with other database storage nodes to transfer the request to the database storage node to retrieve and transmit the relevant data to the user.

In another aspect, the present disclosure provides an originating database entity comprising a controller. The controller is configured to receive a query from a client node and generate a request based on the query. The request comprises an indicator of a function to generate a result according to the query, an indicator of data on which the function is to be performed, and an indicator of a destination for the result to be transmitted. The controller is configured to transmit the request to at least one another database entity.

The originating database entity includes the controller for receiving the query that is further converted into the request that includes the indicator of function to generate a result, an indicator to perform the function, and the indicator of destination. The request is further transmitted to at least one database entity. The originating database entity retrieves the data and transmits the data directly to the client node according to the indicators includes in the request. The transmission of the relevant data directly to the client node reduces the query processing latency which further reduces the CPU and the memory usage.

In yet another aspect, the present disclosure provides a method for use in a database entity comprising a memory. The method comprises receiving a request based on a query received by an originating database entity from a client node. The request comprises an indicator of a function to generate a result, an indicator of data on which the function is to be performed, and an indicator of a destination for the result to be transmitted. The method further comprises retrieving data according to indicators of data, executing the indicated function on the retrieved data, and transmitting the result to the indicated destination.

The method achieves all the advantages and technical effects of the database entity of the present disclosure.

In another aspect, the present disclosure provides a method for use in an originating database entity. The method comprises receiving a query from a client node and generating a request based on the query. The request comprises an indicator of a function to generate a result according to the query, an indicator of data on which the function is to be performed, and an indicator of a destination for the result to be transmitted. The method further provides transmitting the request to at least one another database entity.

The method achieves all the advantages and technical effects of the originating database entity of the present disclosure.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
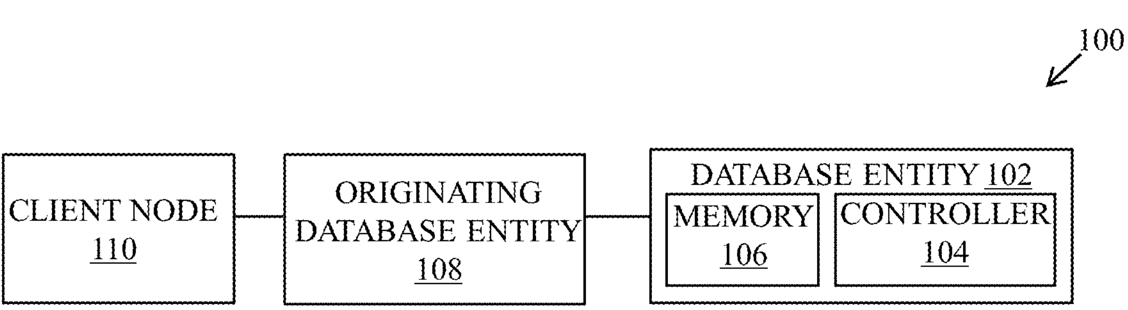
FIG. 1 is a block diagram of a database entity, in accordance with an embodiment of the present disclosure.

FIG. 1 is a block diagram of a database entity, in accordance with an embodiment of the present disclosure. With reference to FIG. 1, there is shown a block diagram 100 that includes a database entity 102, an originating database entity 108, and a client node 110. The database entity 102 further includes a controller 104, and a memory 106.

The database entity 102 includes the controller 104, and the memory 106. The database entity 102 receives a request from the originating database entity 108 and then transmits the relevant data to a destination, such as to the client node 110.

The controller 104 may include suitable logic, circuitry, interfaces, or code that is configured to receive the request from the originating database entity 108. Examples of the controller 104 may include, but are not limited to, a micro-controller, a microprocessor, a central processing unit (CPU), a complex instruction set computing (CISC) processor, an application-specific integrated circuit (ASIC) processor, a reduced instruction set (RISC) processor, a very long instruction word (VLIW) processor, a data processing unit, and other processors or control circuitry.

The memory 106 may include suitable logic, circuitry, interfaces, or code that is configured to store data for generating a relevant result. In an implementation, the memory 106 corresponds to a local memory, such as an Electrically Erasable Programmable Read-Only Memory (EEPROM). Random Access Memory (RAM). Read-Only Memory (ROM), a central processing unit (CPU) cache memory, and the like.

The originating database entity 108 corresponds to a database entity that receives a query from the client node 110 and then transmits the query in the form of the request to the database entity 102.

The client node 110 may include suitable logic, circuitry, interfaces, or code that is configured to send the request to the database entity 102 through thorough the originating database entity 108. Examples of the client node 110 may include but are not limited to, a computer, a personal digital assistant, a portable computing device, or an electronic device.

There is provided the database entity 102 that includes the controller 104 and the memory 106. The controller 104 is configured to receive the request based on the query received by the originating database entity 108 from the client node 110. In other words, the controller 104 receives the request from the client node 110 through the originating database entity 108. Moreover, the request is received based on the query that is received by the originating database entity 108. The request received by the database entity 102 enables the database entity 102 to retrieve the data that is required by the client node 110.

In accordance with an embodiment, the controller 104 is configured to receive the request from the originating database entity 108. Firstly, the client node 110 sends the query to the originating database entity 108, which is converted into the request. The request is further transmitted to the database entity 102 for further execution. Beneficially, the originating database entity 108 enables the controller 104 to receive the request for further generation of the relevant results for the client node 110.

In an implementation, the database entity 102 is a database node and the memory 106 is a local memory. In an example, the database entity 102 is the database node that receives the request from the originating database entity 108, and the memory 106 is the local memory to store and process the data in the database entity 102. Beneficially, the database entity 102 (or the database node) can interact with other database nodes to transfer the request to the database node to retrieve and also to transmit the relevant data to the client node 110. In another implementation, the database entity 102 is a database storage node, and the memory 106 is a disc storage memory. In an example, the database entity 102 is the database storage node that receives the request from the originating database entity 108. In another example, the memory 106 is the disc storage memory to store and process the data in the database entity. Beneficially, the database entity 102 can interact with other database storage nodes to retrieve the relevant data.

In an implementation, the database entity 102 is configured for near data processing. In an example, a near data processing predicate is created that is sent to the database entity 102 to get the relevant data. The near data processing predicate refers to the mathematical function that returns the same value for the same arguments. In another example, the near data processing predicates are minimum, maximum, average, hash functions, divide by modulo, and the like. Beneficially, the database entity 102 configured for near data processing (NDP) capabilities are used by the database entity 102 to provide relevant data only.

In an implementation, the near data processing predicate (e.g., a route predicate and a relevant predicate) is also created to send the request to another database entity and retrieve the relevant data. In an example, the route predicate, such as hash (data) modulo number of nodes in a cluster is sent along with the relevant predicate to get relevant data through the proper route. In another example, the route predicate is invoked on the relevant data when the relevant data is retrieved. In yet another implementation, there can be one or more predicates such as a first predicate corresponds to the selection of relevant data, a second predicate corresponds to route (e.g., hash function on data, modulo number of nodes in the cluster database, and the line) for the selection of the correct destination. Beneficially, the route predicate specifies the destination of the data which further shortens the query processing latency and drastically reduces CPU, memory, and networking waste.

The request includes an indicator of a function to generate a result. The indicator of function provides the information of the function that indicates the database entity 102 about the data that is required to be retrieved to generate the final result. The indicator of the function (e.g., f(x,y)) is an identifier for a function in a library that is compiled and then executed to generate the result, as further shown and described in FIG. 5. The request further includes an indicator of data on which the function is to be performed. The indicator of data on which the function is to be performed (e.g., f, routes, and pages) corresponds to an address of data, pages, and the page numbers of the data. The indicator of data depends upon the database entity 102 that receives the request. In an example, the address of data is the data on which the function is to be performed by the controller with the help of the predicate, and after the implementation of the function of the data, retrieval of the data for further transmission.

In an implementation, the controller 104 is configured to receive the request from another database entity and the data indicator includes a partial result to be further processed by the indicated function. In other words, the database entity 102 receives the request from the another database entity to retrieve the relevant result, and also to transmit the final result to the client node 110. Moreover, the data indicator (or the indicator of the data) on which the function is to be performed includes the partial result, which is further processed by the indicated function (or indicator of the function) to generate the result. In an example, the partial result corresponds to the result that is retrieved by the another database entity that further transmits the request to the database entity 102. In another example, the partial result corresponds to the combination of two or more partial results, such as the data retrieved from one or more other database entities, and then transmitted to the database entity 102 for the generation of the complete result.

The request further includes an indicator of a destination for the result to be transmitted. In an example, the indicator of destination is another database entity for processing the partial result further. In another example, the indicator of destination is the client node 110 to transmit the final result to the client node 110. The indicator of the destination is beneficial to transmit the result, which further shortens the query processing latency.

The controller 104 is configured to retrieve the data according to the indicator of data. In an example, the indicator of data on which the function is to be performed corresponds to an address of data (e.g., f and routes). In another example, the indicator of data on which the function is to be performed corresponds to an address of pages and page numbers (e.g., pages). Moreover, the controller 104 retrieves the data according to the indicator of data on which the function is to be performed (e.g., f and pages). In an example, the indicator of data depends upon the database entity 102 that receives the request as further shown and described in FIG. 5. In an implementation, the controller 104 is configured to retrieve the data according to the indicator of data from the memory 106. For example, the indicator of the data is firstly stored in the memory 106 and then the controller 104 retrieves the data from the memory 106. In another implementation, the controller 104 is configured to retrieve the data from another database entity as indicated by the indicator of data. In an example, the indicator of the data indicates the destination of data as another database entity and the controller 104 retrieves the data from the another database entity. In yet another implementation, the controller 104 is configured to retrieve the data by receiving the data. Optionally, the data is retrieved by receiving the data without function or destination (i.e., data received is not as part of a request) by the controller 104.

The controller 104 is configured to execute the indicated function on the retrieved data. In other words, the controller 104 executes the indicated function on the data that is retrieved according to the indicator of data. The indicated function (e.g., f (x, y)) is referred to as an identifier for a function in the library that is compiled and then executed, as further shown, and described in FIG. 5. In an example, the execution of the indicated function is based on the near data processing predicate.

The controller 104 is configured to transmit the result to the indicated destination. In other words, the controller 104 transmits the result to the indicated destination after the retrieval of data and after execution of the indicated function that is included in the request sent by the client node 110. In an implementation, the destination is the another database entity and the controller 104 is configured to generate a partial result and transmit the partial result to the another database entity. In addition, the controller 104 generates the partial results after the retrieval and execution of the relevant data and then transmits the partial results to the another database entity in the form of a request.

In a further implementation, the controller 104 is configured to transmit the partial result by generating a further request. The further request includes the partial result, the indicator of function, and a further indicator of destination. Further, the controller 104 is configured to transmit the further request to the another database entity. Firstly, the controller 104 receives the request that includes the indicator of destination, the indicator of data, and the indicator of function due to which the controller 104 generates the partial result. After that, the partial result is further transmitted to the another database entity in the form of the further request along with the indicator of function along with the indicator of destination.

In an implementation, the controller 104 is configured to generate a final result, and the destination is the client node 110. In other words, the controller 104 generates the final result and further transmits the final results to the client node 110. In an example, the controller 104 is configured to generate the final result after the retrieval of the data through the request that includes the partial result. In another example, the controller 104 is configured to generate the final result directly through the request received from the client node 110 through the originating database entity 108. Finally, the final result is transmitted to the client node 110 by the controller 104.

The database entity 102 includes the controller 104 for receiving the request enables the database entity 102 to retrieve the data and transmit the data directly to the client node 110. The transmission of the relevant data directly to the client node 110 reduces the query processing latency which further reduces the CPU memory usage, and less bandwidth is used. Further, the controller 104 reduces the memory copies, and the context switches between the user and the kernel.

Figure 2:
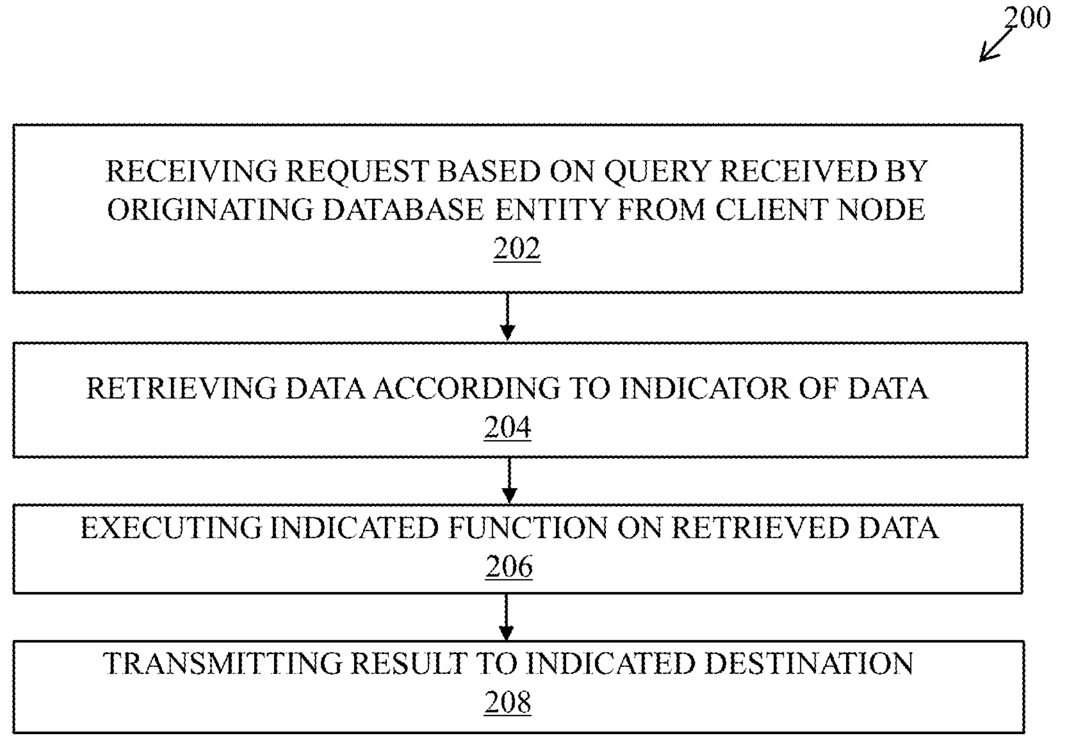
FIG. 2 is a flowchart of a database entity for receiving a request from an originating database entity, in accordance with another embodiment of the present disclosure.

FIG. 2 is a flowchart of a method for use in a database entity that includes a controller configured for receiving a request from an originating database entity, in accordance with another embodiment of the present disclosure. FIG. 2 is described in conjunction with elements from FIG. 1. With reference to FIG. 2, there is shown a flowchart of method 200 for use in a database entity 102 that includes the controller 104 that is configured for receiving the request from the originating database entity 108. The method 200 includes steps 202 to 208.

There is provided the method 200 for use for in the database entity 102 including the memory 106 for the retrieval and transmission of the relevant data as requested by the client node 110.

At step 202, the method 200 includes, receiving the request based on the query received by the originating database entity 108 from the client node 110. In other words, the database entity 102 includes the controller 104 that is configured to receive the request from the client node 110 through the originating database entity 108. Moreover, the request is received based on the query received by the originating database entity 108. The request received by the database entity 102 enables the database entity 102 to retrieve the data required by the client node 110.

In accordance with an embodiment, the method further includes receiving the request from the originating database entity 108. Firstly, the client node 110 sends the query to the originating database entity 108, which is converted into the request. The request is further transmitted to the database entity 102 for further execution. Beneficially, the originating database entity 108 enables the controller 104 to receive the request for further generation of the relevant results for the client node 110.

In an implementation, the method 200 provides the database entity 102, which is a database node and the memory 106 is a local memory. In an example, the database entity is the database node that receives the request from the originating database entity 108, and the memory 106 is the local memory to store and process the data in the database entity. Beneficially, the database entity 102 (or the database node) can interact with other database nodes to transfer the request to the database node to retrieve and also to transmit the relevant data to the client node 110. In another implementation, the method 200 provides the database entity 102, which is a database storage node, and the memory 106 is a disc storage memory. In an example, the database entity 102 is the database storage node that receives the request from the originating database entity 108. In another example, the memory 106 is the disc storage memory to store and process the data in the database entity. Beneficially, the database entity 102 can interact with other database storage nodes to retrieve the relevant data.

In an implementation, the method 200 provides the database entity 102 that is configured for near data processing. In an example, a near data processing predicate is created that is sent to the database entity 102 to get the relevant data. The near data processing predicate refers to the mathematical function that returns the same value for the same arguments. In another example, the near data processing predicates are minimum, maximum, average, hash functions, divide by modulo, and the like. Beneficially, the database entity 102 configured for near data processing (NDP) capabilities are used by the database entity 102 to reduce the amount of processed data.

In an implementation, the near data processing predicate (e.g., a route predicate and a relevant predicate) is also created to send the request to another database entity and retrieve the relevant data. In an example, the route predicate, such as hash (data) modulo number of nodes in a cluster is sent along with the relevant predicate to get relevant data through the proper route. In another example, the route predicate is invoked on the relevant data when the relevant data is retrieved. In yet another implementation, there can be one or more predicates such as a first predicate corresponds to the selection of relevant data, a second predicate corresponds to route (e.g., hash function on data, modulo number of nodes in the cluster database, and the line) for the selection of the correct destination. Beneficially, the route predicate specifies the destination of the data which further shortens the query processing latency and drastically reduces CPU, memory and networking waste.

The request includes an indicator of a function to generate a result, an indicator of data on which the function is to be performed, and an indicator of a destination for the result to be transmitted. The indicator of function provides the information of the function that indicates the database entity 102 about the data that is required to be retrieved to generate the final result. The indicator of the function (e.g., f(x,y)) is an identifier for a function in a library that is compiled and then executed to generate the result, as further shown and described in FIG. 5. The request further includes an indicator of data on which the function is to be performed. The indicator of data on which the function is to be performed (e.g., f, routes, and pages) corresponds to an address of data, pages, and the page numbers of the data. The indicator of data depends upon the database entity 102 that receives the request. In an example, the address of data is the data on which the function is to be performed by the controller with the help of the predicate, and after the implementation of the function of the data, retrieval of the data for further transmission.

In an implementation, the method 200 includes receiving the request from another database entity and the data indicator includes a partial result to be further processed by the indicated function. In other words, the method 200 provides the database entity 102 that receives the request from another database entity to retrieve the relevant result and to transmit the complete result to the client node 110. Moreover, the data indicator (or the indicator of the data) on which the function is to be performed includes the partial result, which is further processed by the indicated function (or indicator of the function) to generate the result. In an example, the partial result corresponds to the result that is retrieved by the another database entity that further transmits the request to the database entity 102. In another example, the partial result corresponds to the combination of two or more partial results, such as the data retrieved from one or more other database entities, and then transmitted to the database entity 102 for the generation of the complete result.

The request further includes an indicator of a destination for the result to be transmitted. In an example, the indicator of destination is another database entity for processing the partial result further. In another example, the indicator of destination is the client node 110 to transmit the final result to the client node 110. The indicator of the destination is beneficial to transmit the result, which further shortens the query processing latency.

At step 204, the method 200 includes, retrieving data according to the indicator of data. In other words, the controller 104 retrieves the data according to the indicator of the data. In an example, the indicator of data on which the function is to be performed corresponds to an address of data (e.g., f and routes). In another example, the indicator of data on which the function is to be performed corresponds to an address of pages and page numbers (e.g., pages). Moreover, the controller 104 retrieves the data according to the indicator of data on which the function is to be performed (e.g., f and pages). In an example, the indicator of data depends upon the database entity 102 that receives the request as further shown and described in FIG. 5.

In an implementation, the method 200 further includes retrieving the data according to the indicator of data from the memory 106. For example, the indicator of the data is firstly stored in the memory 106 and then the controller 104 retrieves the data from the memory 106. In another implementation, the method 200 further includes retrieving the data from another database entity as indicated by the indicator of data. In an example, the indicator of the data indicates the destination of data as another database entity and the controller 104 retrieves the data from another database entity. In yet another implementation, the method 200 further includes retrieving the data by receiving the data. Optionally, the data is retrieved by receiving the data without function or destination (i.e., data received is not as part of a request) by the controller 104.

At step 206, the method 200 includes, executing the indicated function on the retrieved data. In other words, the controller 104 executes the indicated function on the data that is retrieved according to the indicator of data. The indicated function (e.g., f (x, y)) is referred to as an identifier for a function in the library that is compiled and then executed, as further shown, and described in FIG. 5. In an example, the execution of the indicator is based on the near data processing predicate.

At step 208, the method 200 includes, transmitting the result to the indicated destination. In other words, the controller 104 transmits the result to the destination after the retrieval of data and after execution of the indicated function that is included in the request sent by the client node 110. In an implementation, the destination is another database entity and the method 200 includes generating a partial result and transmitting the partial result to the another database entity. In addition, the controller 104 generates the partial results after the retrieval and execution of the relevant data and then transmits the partial results to the another database entity in the form of a request.

In a further implementation, the method 200 includes transmitting the partial result by generating a further request. The request includes the partial result, the indicator of function, and a further indicator of destination. Further, the method 200 includes transmitting the further request to another database entity. Firstly, the controller 104 receives the request that includes the indicator of destination, the indicator of data, and the indicator of function due to which the controller 104 generates the partial result. After that the partial result is further transmitted to the another database entity in the form of the further request along with the indicator of function along with the indicator of destination.

In an implementation, the method 200 includes generating a final result, and the destination is the client node 110. In other words, the method provides the controller 104 that generates the final result and further transmits the final results to the client node 110. In an example, the controller 104 is configured to generate the final result after the retrieval of the data through the request that includes the partial result. In another example, the controller 104 is configured to generate the final result directly through the request received from the client node 110 through the originating database entity 108. Finally, the controller 104 is configured to transmit the final result to the client node 110.

The method 200 is used in the database entity 102 that includes the controller 104 for receiving the request which enables the database entity 102 to retrieve the data and transmit the data directly to the client node 110. The transmission of the relevant data directly to the client node 110 reduces the query processing latency which further reduces the CPU memory usage, and less bandwidth is used. Further, the method 200 reduces the memory copies, and the context switches between the user and the kernel.

The steps 202 to 208 are only illustrative, and other alternatives can also be provided where one or more steps are added, one or more steps are removed, or one or more steps are provided in a different sequence without departing from the scope of the claim herein.

Figure 3:
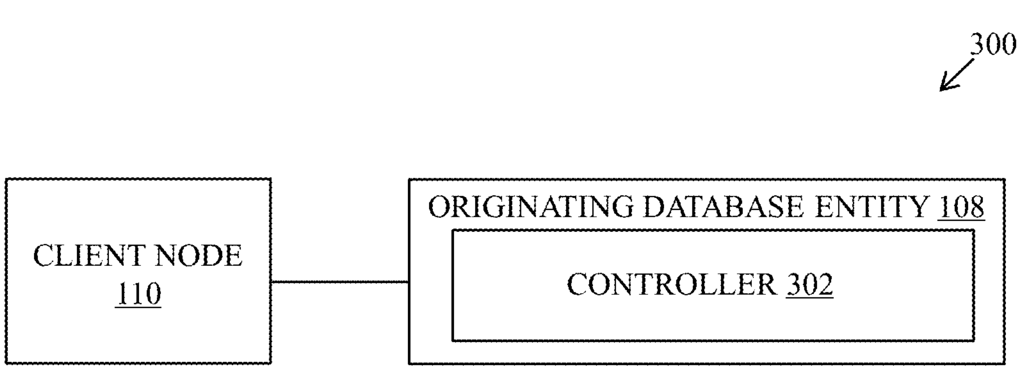
FIG. 3 is a block diagram of an originating database entity for receiving a request from a client node, in accordance with an embodiment of the present disclosure.

FIG. 3 is a block diagram of an originating database entity for receiving a request from a client node, in accordance with an embodiment of the present disclosure. FIG. 3 is described in conjunction with elements from FIGS. 1, and 2. With reference to FIG. 3, there is shown a block diagram 300 that includes the originating database entity 108 and the client node 110. The originating database entity 108 further includes a controller 302.

The controller 302 may include suitable logic, circuitry, interfaces, or code that is configured to receive a query from the client node 110. Examples of the controller 302 may include, but are not limited to, a microcontroller, a microprocessor, a central processing unit (CPU), a complex instruction set computing (CISC) processor, an application-specific integrated circuit (ASIC) processor, a reduced instruction set (RISC) processor, a very long instruction word (VLIW) processor, a data processing unit, and other processors or control circuitry.

There is provided, the originating database entity 108 that includes the controller 302. The controller 302 is configured to receive a query from the client node 110. The controller 302 is configured to generate a request based on the query. In other words, the originating database entity 108 includes the controller 302 that is configured to receive the query from the client node 110. Moreover, the query received by the originating database entity 108 is further converted into the request. In other words, the originating database entity 108 generates the request based on the query. As the query includes the information about the data required by the client node 110, thus the query is converted by the controller 302 of the originating database entity 108 for further transmission of the request to the database entity 102.

The request includes an indicator of a function to generate a result according to the query. The indicator of the function provides the information of the function that indicates the database entity 102 about the data that is required to be retrieved to generate the final result. The indicator of the function (e.g., f(x,y)) is an identifier for a function in a library that is compiled and then executed to generate the result, as further shown and described in FIG. 5. The request further includes an indicator of data on which the function is to be performed. The indicator of data on which the function is to be performed (e.g., f, routes, and pages) corresponds to an address of data, pages, and the page numbers of the data. The indicator of data depends upon the database entity 102 that receives the request. In an example, the address of data is the data on which the function is to be performed by the controller with the help of a predicate, and after the implementation of the function of the data, retrieval of the data for further transmission. The request further includes an indicator of a destination for the result to be transmitted. In an example, the indicator of the destination is the another database entity for processing the partial result further. The indicator of the destination is beneficial to transmit the result, which further shortens the query processing latency.

The controller 302 is further configured to transmit the request to at least one another database entity. In other words, the controller 302 transmits the request to at least one another database entity after the generation of the request. Moreover, the controller 302 of the originating database entity 108 converts the query received by the client node 110 into the request and further transmits the request to at least one another database entity to transmit the relevant data to the client node 110. In an example, the controller 302 transmits the request to one another database entity. In another example, the controller 302 transmits the request to more than one database entity.

The originating database entity 108 includes the controller 302 for receiving the query that is further converted into the request that includes the indicator of function to generate a result, an indicator to perform the function, and the indicator of destination. The request is further transmitted to at least one database entity. The originating database entity 108 retrieves the data and transmits the data directly to the client node 110 according to the indicators includes in the request. The transmission of the relevant data directly to the client node 110 reduces the query processing latency which further reduces the CPU memory usage.

Figure 4:
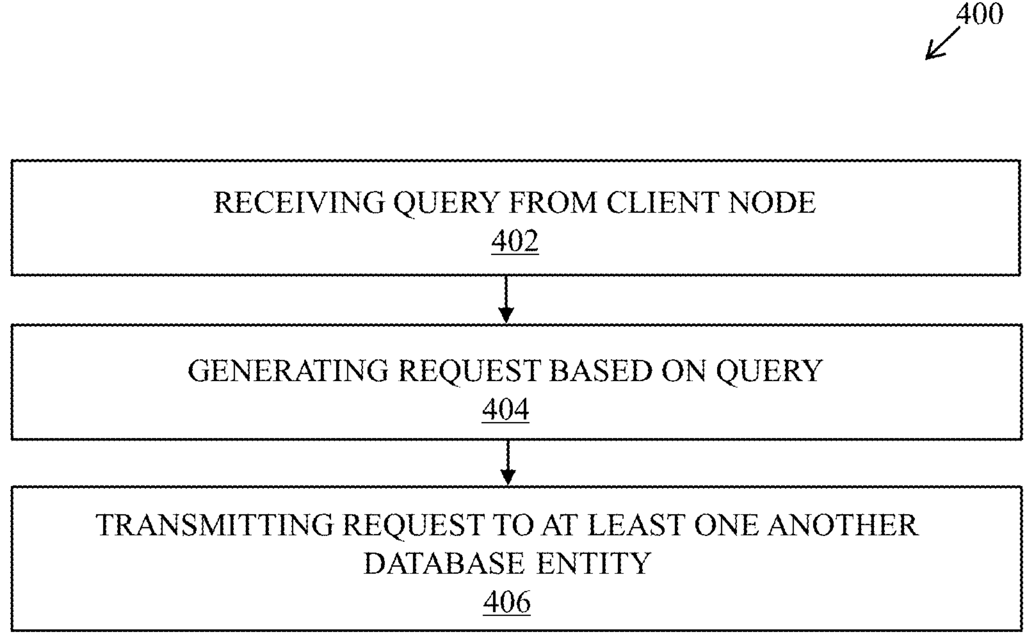
FIG. 4 is a flowchart of an originating database entity for receiving a query from a client node, in accordance with another embodiment of the present disclosure.

FIG. 4 is a flowchart of an originating database entity for receiving a query from a client node, in accordance with another embodiment of the present disclosure. FIG. 4 is described in conjunction with elements from FIGS. 1, 2, and 3. With reference to FIG. 4, there is shown a flow chart of a method 400 for use in an originating database entity 108 that includes the controller 302. The method 400 includes steps 402 to 406.

There is provided the method 400 for use the originating database entity 108. The method 400 provides the conversion of the query into the request and transmission of the request to the database entity 102.

At step 402, the method 400 includes receiving a query from a client node 110. In other words, the originating database entity 108 includes the controller 302 that is configured to receive the query from the client node 110.

At step 404, the method 400 includes, generating a request based on the query. In other words, the originating database entity 108 generates the request based on the query. As the query includes the information about the data required by the client node 110, thus the query is converted by the controller 302 of the originating database entity 108 for further transmission of the request to the database entity 102. The request includes an indicator of a function to generate a result according to the query. The indicator of function provides the information of the function that indicates the database entity 102 about the data that is required to be retrieved to generate the final result. The indicator of the function (e.g., f(x,y)) is an identifier for a function in a library that is compiled and then executed to generate the result, as further shown and described in FIG. 5. The request further includes an indicator of data on which the function is to be performed. The indicator of data on which the function is to be performed (e.g., f, routes, and pages) corresponds to an address of data, pages, and the page numbers of the data. The indicator of data depends upon the database entity 102 that receives the request. In an example, the address of data is the data on which the function is to be performed by the controller with the help of the predicate, and after the implementation of the function of the data, retrieval of the data for further transmission. The request further includes an indicator of a destination for the result to be transmitted. In an example, the indicator of destination is another database entity for processing the partial result further. The indicator of the destination is beneficial to transmit the result, which further shortens the query processing latency.

At step 406, the method 400 includes, transmitting the request to at least one another database entity. In other words, the controller 302 transmits the request to at least one another database entity after the generation of the request. Moreover, the controller 302 of the originating database entity 108 converts the query received by the client node 110 into the request and further transmits the request to at least one another database entity to transmit the relevant data to the client node 110. In an example, the controller 302 transmits the request to one another database entity. In another example, the controller 302 transmits the request to more than one database entity.

The method 400 provides the originating database entity 108 that includes the controller 302 for receiving the query that is further converted into the request that includes the indicator of function to generate a result, an indicator to perform the function, and the indicator of destination. The request is further transmitted to at least one database entity. The method 400 retrieves the data and transmits the data directly to the client node 110 according to the indicators includes in the request. The transmission of the relevant data directly to the client node 110 reduces the query processing latency which further reduces the CPU memory usage.

The steps 402 to 406 are only illustrative, and other alternatives can also be provided where one or more steps are added, one or more steps are removed, or one or more steps are provided in a different sequence without departing from the scope of the claim herein.

Figure 5:
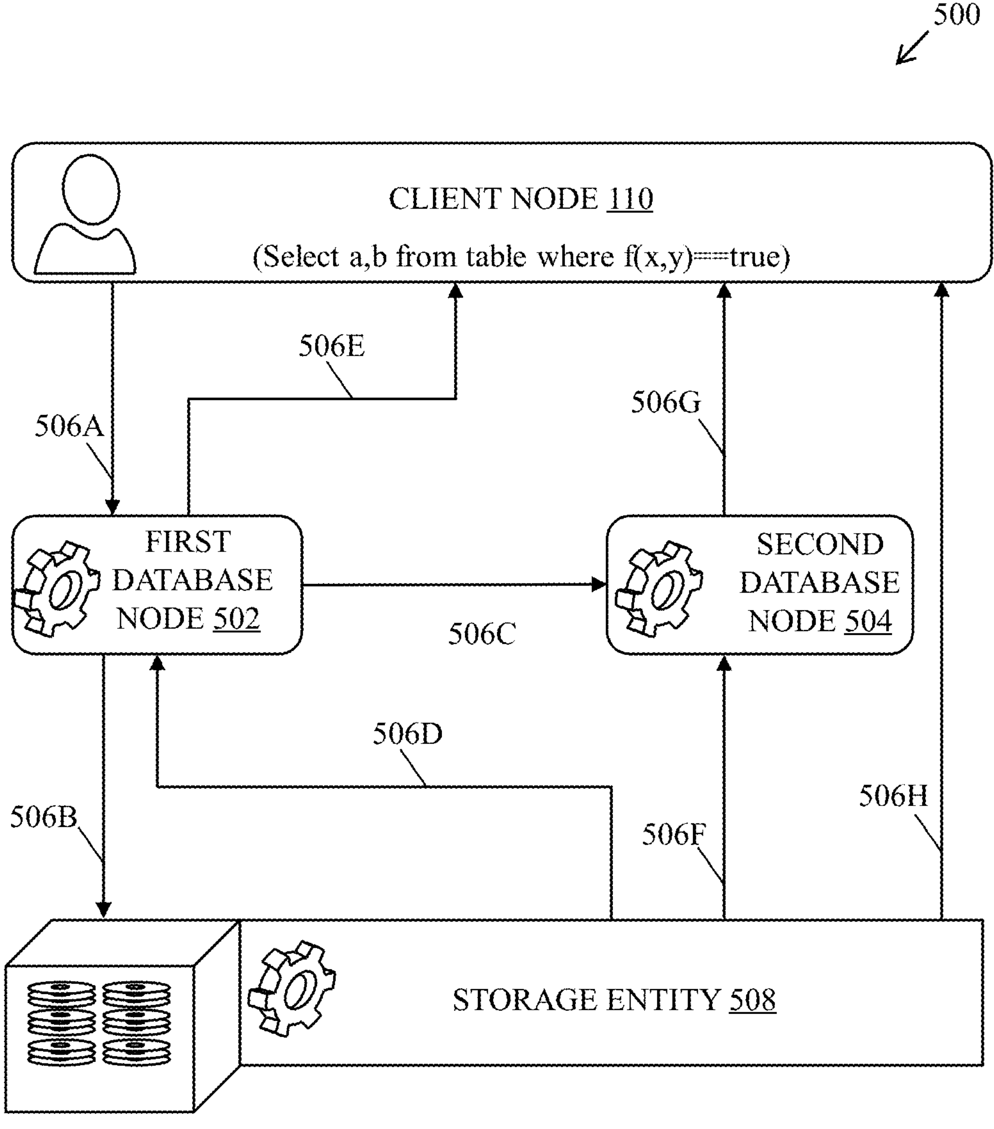
FIG. 5 is an illustration of flow of a request from a client node to a storage entity through different routes, in accordance with an embodiment of the present disclosure.

FIG. 5 is an illustration of flow of a request from a client node to a storage entity through different routes, in accordance with an embodiment of the present disclosure. FIG. 5 is described in conjunction with elements from FIGS. 1, 2, 3, and 4. With reference to FIG. 5, there is shown an illustration 500 of the flow of a request from the client node 110. The illustration 500 includes operations 506A to 506H.

At operation 506A, the client node 110 sends a query to a first database node 502, which corresponds to the originating database entity 108 of FIG. 1. The query includes a function (e.g., select a,b from a table where f(x,y)==true) for the retrieval of required data from the storage entity 508. The storage entity 508 corresponds to a storage that receives the request from the first database node 502 (or the originating database entity 108 and the memory 106 is a local memory to store and process the data to send the relevant data to the client node 110. In an implementation, the retrieval of data by the first database node 502 is from one or more storage nodes. The first database node 502 (or the originating database entity 108) converts the query into the request. In an example, the request includes certain indicators, and the indicators correspond to the indicator of a function, the indicator of data to be performed, and the indicator of destination. The indicator of the function (e.g., select a,b from a table where f(x,y)==true) is used to generate a result. The indicator of the function provides the information of the function that indicates the storage entity 508 about the data that is required to be retrieved. Further, the indicator of the data on which the function is to be performed (e.g., f, routed, and pages) corresponds to the address of data, pages, and the page numbers of the data. Moreover, the indicator of the destination corresponds to the address of the another database node or the client node 110 to which the retrieved data is to be transmitted. In an example, the indicator of destination is a second database node 504 for processing the partial result. In another example, the indicator of destination is the client node 110 to transmit the final result to the client node 110. The examples of the indicator of the destination may include but are not limited to, selection of the another database node (or entity), skipping of any database entity regardless a generated result item, that always sends result directly to the client node 110, and the like. In an example, the selection of the another database node is performed through a number of nodes in a clustered database (e.g., N to be a number of database entities). In another example, the selection of the another database node is performed through a hash function, which is a mathematical function that maps data of arbitrary size to fixed-size value (e.g., "integer" number). In another example, selection of the another database node is performed through hash modulo N that returns the storage entity 508, which will handle hash modulo N from the resulting set. In an implementation, the indicator of the destination also corresponds to replication between database clusters, and a resulting set may be sent directly to the another database node (or cluster) or even a few of them, or skipping the data copy to the "main" database entity. In an implementation, a phase of conversion of the query into the request is referred to as a prepare phase. During the prepare phase, the originating database entity 108 prepares the indicators for the flow of the request and further for retrieval of the relevant data. In an example, a near data processing (NDP) predicate (e.g., a route predicate and a relevant predicate) is also created to send the request to the second database node 504 and to retrieve the relevant data. The route predicate (e.g., hash (data), modulo) is sent along with the relevant predicate to get relevant data through the proper route. In another example, the route predicate is invoked on the relevant data when the relevant data is retrieved. In yet another example, there can be one or more predicates such as a first predicate corresponds to the selection of relevant data, a second predicate corresponds to route (e.g., hash function on data, modulo number of nodes in the cluster database, and the line) for the selection of the correct destination.

At operation 506B, the first database node 502 sends the request (e.g., f, routes, and address) to the storage entity 508. The storage entity 508 retrieves the relevant data after the execution of the function indicated by the indicator of function in the request. Moreover, at operation 506C, the first database node 502 sends another request (e.g., f, routes, and pages) to the second database node 504.

Further, the storage entity 508 sends the relevant data to the various destinations as mentioned in the indicator of destination. In an example, the storage entity 508 sends the relevant data to the first database node 502, such as through operation 506D, and the first database node 502 further transmits the relevant data to the client node 110, such as through operation 506E. In another example, the storage entity 508 sends the relevant data to the second database node 504, such as through operation 506F, and the second database node 504 further transmits the data to the client node 110, such as through operation 506G. In yet another example, the storage entity 508 sends the relevant data to the client node 110, such as through operation 506H. Beneficially, the transmission of the relevant data directly to the client node 110 reduces the query processing latency which further reduces the CPU memory usage, and less bandwidth is used. Further, the controller 104 reduces the memory copies, and the context switches between the user and the kernel.

Modifications to embodiments of the present disclosure described in the foregoing are possible without departing from the scope of the present disclosure as defined by the accompanying claims. Expressions such as "including". "comprising". "incorporating". "have". "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A database entity configured for near data processing and comprising a controller and a memory, wherein the controller is configured to:

receive, by the database entity, a request based on a query received by an originating database entity from a client node, wherein the request comprises an indicator of a function to be performed on locally stored data, an indicator of the locally stored data on which the function is to be performed, and an indicator of a remote destination for a result;

retrieve, by the database entity, the locally stored data according to the indicator of data;

execute, by the database entity, the indicated function on the retrieved data to generate the result, wherein the result is a partial result to be further processed by the indicated remote destination; and transmit, by the database entity, the result to the indicated remote destination, wherein the result is transmitted without transmitting any of the retrieved data.

2. The database entity according to claim 1, wherein the controller is configured to receive the request from the originating database entity.

3. The database entity according to claim 1, wherein the controller is configured to transmit the partial result by generating a further request comprising the partial result, the indicator of function and a further indicator of destination, and to transmit the further request to the remote destination.

4. The database entity according to claim 1, wherein the controller is configured to generate a final result and wherein the destination is the client node.

5. The database entity according to claim 1, wherein the controller is configured to receive the request from another database entity and wherein the indicator of data includes a partial result to be further processed by the indicated function.

6. The database entity according to claim 1, wherein the controller is configured to retrieve the data from another database entity as indicated by the indicator of data.

7. The database entity according to claim 1, wherein the database entity is a database node, wherein the memory is a local memory.

8. The database entity according to claim 1, wherein the database entity is a database storage node, wherein the memory is a disc storage memory.

9. The database entity according to claim 1, wherein the indicator of the locally stored data identifies a subset of the locally stored data, and the controller is configured to execute the indicated function on the subset of the locally stored data.

10. The database entity according to claim 1, wherein the result comprises less data than the locally stored data on which the function is performed.

11. The database entity according to claim 1, wherein the partial result is configured to be used as input data for execution of a further function by an indicated remote database entity.

12. An originating database entity comprising a controller, wherein the controller is configured to:

receive, by the originating database entity, a query from a client node;

generate, by the originating database entity, a request based on the query and to be sent to a destination database entity, wherein the request comprises an indicator of a function to be performed on data according to the query, an indicator of the data on which the function is to be performed, and an indicator of a remote destination for a result, wherein the data is locally stored at the destination database entity, and wherein the result is a partial result to be further processed by the indicated remote destination; and transmit, by the originating database entity, the request to the destination database entity configured for processing.

13. The originating database entity according to claim 12, wherein the partial result is configured to be used as input data for execution of a further function by an indicated remote database entity.

14. A method for use in a database entity configured for near data processing and comprising a memory, wherein the method comprises:

receiving a request based on a query received by an originating database entity from a client node, wherein the request comprises an indicator of a function to be performed on locally stored data, an indicator of the locally stored data on which the function is to be performed, and an indicator of a remote destination for a result;

retrieving the locally stored data according to the indicator of data;

executing the indicated function on the retrieved data to generate the result, wherein the result is a partial result to be further processed by the indicated remote destination; and transmitting the result to the indicated remote destination, wherein the result is transmitted without transmitting any of the retrieved data.

15. The method according to claim 14, further comprising receiving the request from the originating database entity.

16. The method according to claim 14, further comprising transmitting the partial result by generating a further request comprising the partial result, the indicator of function and a further indicator of destination, and transmitting the further request to another database entity.

17. The method according to claim 14, further comprising generating a final result and wherein the destination is the client node.

18. The method according to claim 14, further comprising receiving the request from another database entity and wherein the indicator of data includes a partial result to be further processed by the indicated function.

19. The method according to claim 14, further comprising retrieving the data according to the indicator of data from the memory.

20. The method according to claim 14, wherein the method further comprises retrieving the data from another database entity as indicated by the indicator of data.

* * * * *